Sept. 8, 1959   R. T. COLLINS ET AL   2,903,217
MATERIAL HANDLING MEANS
Filed July 24, 1956   3 Sheets-Sheet 1

INVENTORS
Roy T. Collins,
Arthur R. Dey, &
BY Joseph L. Winston

L. D. Burch
ATTORNEY

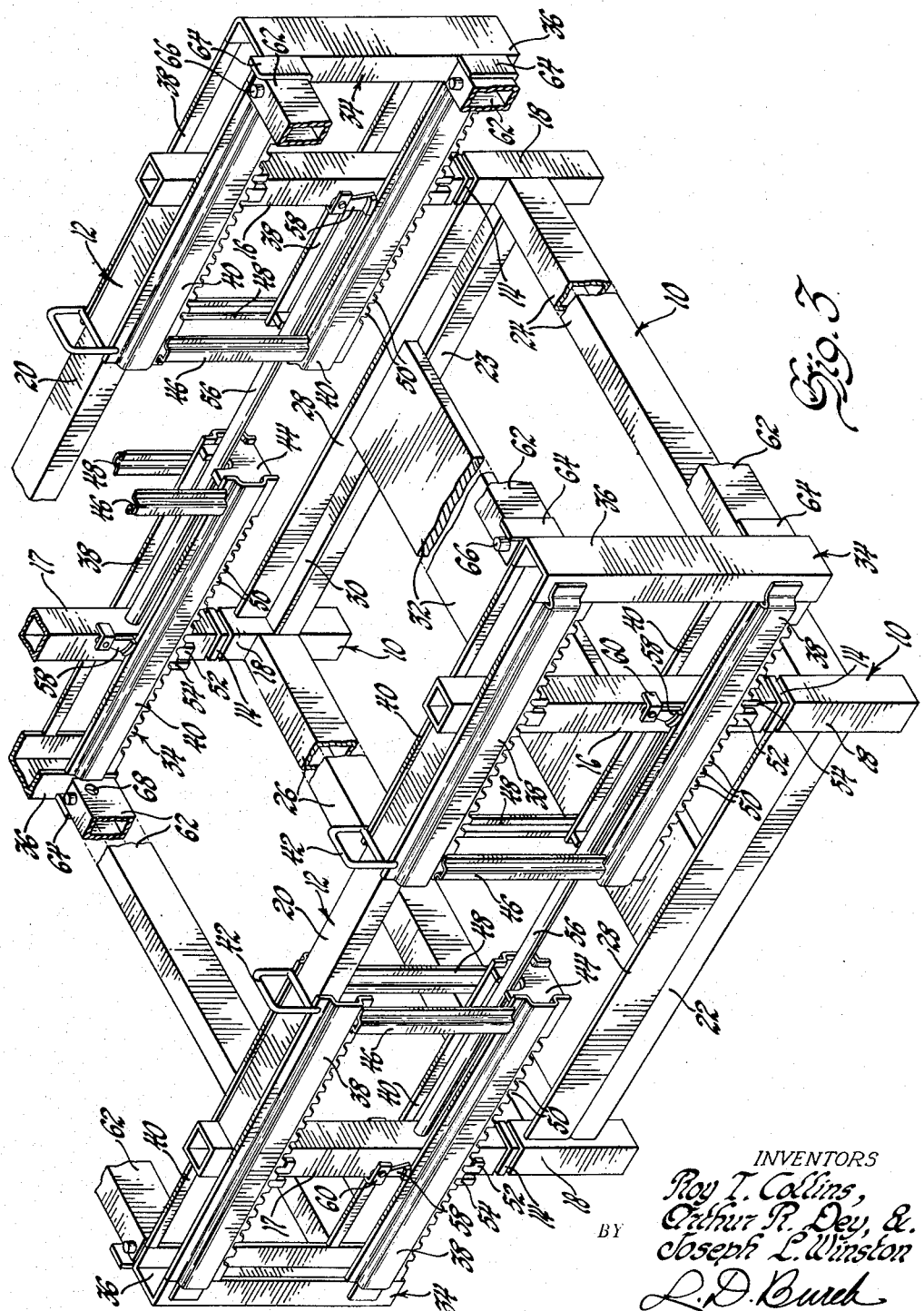

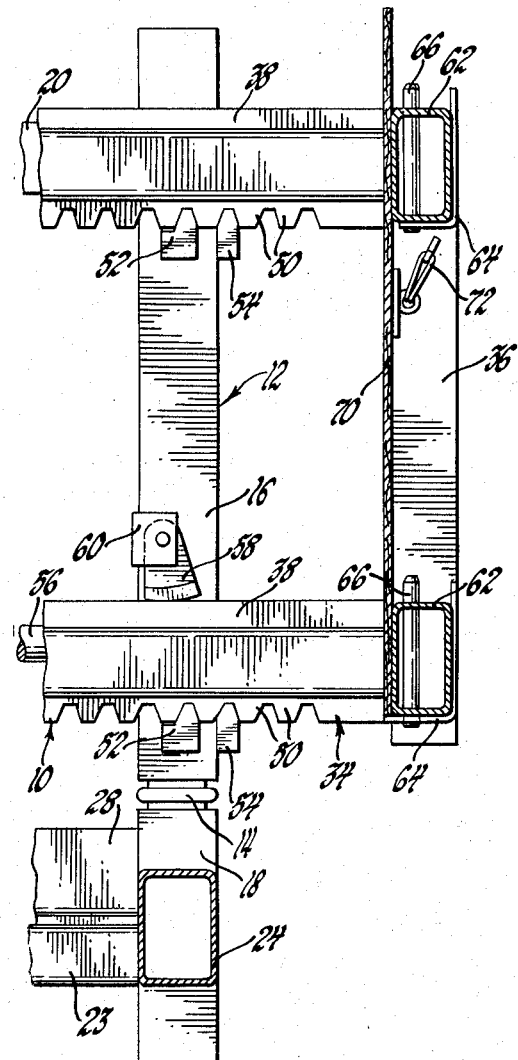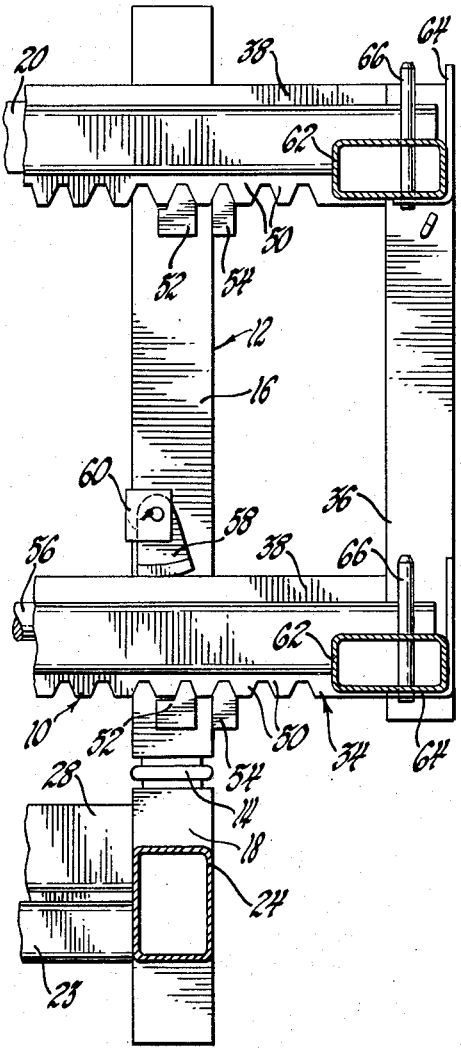

United States Patent Office 2,903,217
Patented Sept. 8, 1959

2,903,217

MATERIAL HANDLING MEANS

Roy T. Collins, St. Clair Shores, Arthur R. Dey, Pontiac, and Joseph L. Winston, Dearborn, Mich., assignors to General Motors Corporation, Detroit, Mich., a corporation of Delaware Application July 24, 1956, Serial No. 599,771

8 Claims. (Cl. 248—120)

This invention relates to material handling means in general and more particularly to material handling rack and pallet means.

Numerous different material handling rack and pallet means are known for use in carrying materials of different shapes and sizes.

It is here proposed to provide a material handling rack or pallet adaptable to accommodating many different materials almost without regard to their shape or size. It is proposed to have each pallet include a base frame dimensioned in length in accord with the transportation means with which it is to be used; that is, freight car, truck trailer, or otherwise. This facilitates pallet loading without requiring additional stays and shoring within the transportation means.

Means are also provided for assembly with the base frame which makes the width and height of the pallet variable in accord with the size and shape of the material to be carried thereon. This includes a square A frame either detachably mounted or fixed on each end of the base frame and having adjustable arms which may be extended to the limits defining the width of the material to be carried on the pallet. Several increments of arm adjustment are provided to insure secure loading without additional shoring. In addition, side wall defining members may be provided to equalize the edge loading of materials carried by the pallet means.

The disposition of the square A frame relative to the base frame may be varied to raise the height of the end walls of the pallet means, and consequently the side walls, by the use of extension members cooperatively disposed between the base and square A frame members. Likewise two or more square A frames may be used at each end of the base member if required.

The proposed material handling pallet means is readily loaded, unloaded and stored in transportation or storage facilities. The pallet means may be nested with other similar pallets, is readily knocked down when not in use and includes parts interchangeable with other pallets of similar construction.

In the drawings:

Figure 3 is a schematic view of the pallet means of Figure 1 having parts broken away and shown in cross-section.

Figure 4 is a fragmentary view of a part of the disclosed pallet means showing means for varying the extended length of the extendable side arm assemblies.

Figure 5 is similar to Figure 4 and shows another means of varying the extended disposition of the arm assemblies.

Figure 1:
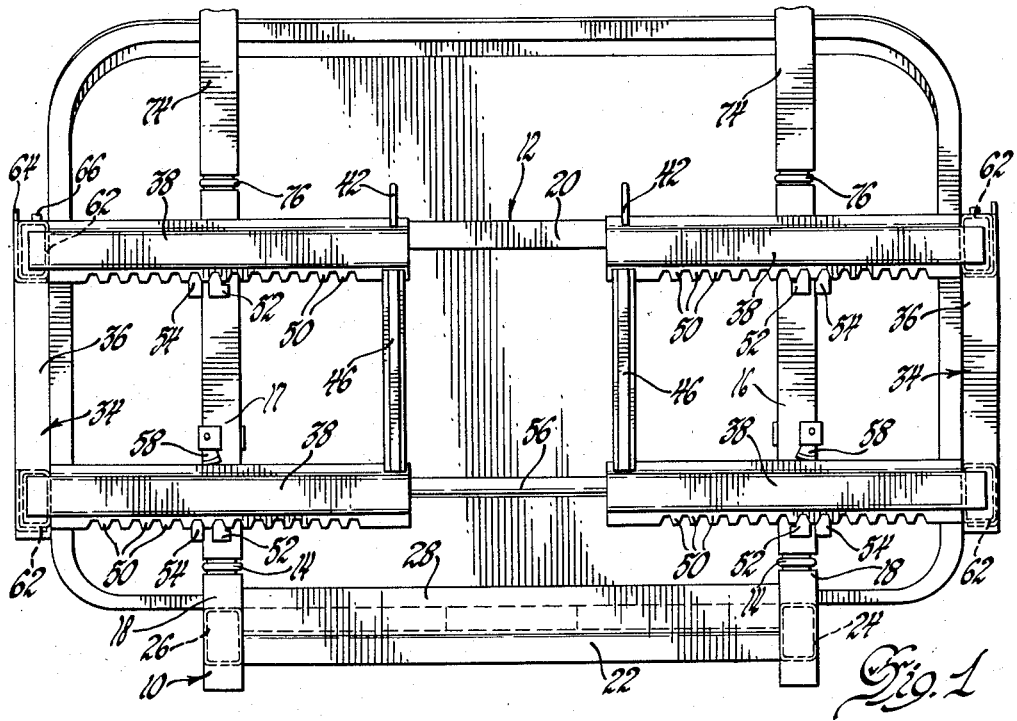
Figure 1 is an end view of an embodiment of the proposed rack or pallet means having the side arm members extended to accommodate materials of a given width.
Figure 2:
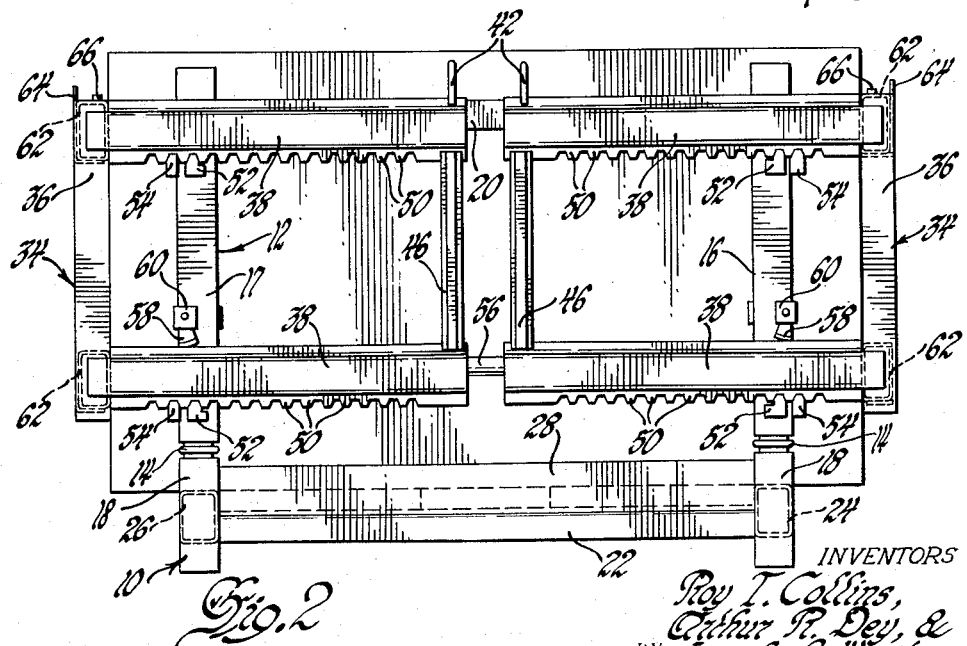
Figure 2 is another end view of the rack or pallet means of Figure 1 as adapted to accommodate a different size material.

The disclosed rack or pallet means includes a rectangular base frame 10 having side rails 24 and 26 connected by end rails 22 and 23 and including upright legs 18 at each corner. The legs 18 are boxed tubular sections adapted to receive the square A frame members 12 at either or both ends of the base frame by means of connectors 14 which include guide pins (not shown) extending into adjacent ends of the legs 18 and A frame post members.

The square A frame members include boxed tubular upright posts or stanchions 16 and 17 having a cross rail 20 secured between their upper ends and a support rail or rod 56 between the ends thereof.

Extendable arm members 34 are secured in pairs to each square A frame member 12 and are extended in opposite directions. The arm members 34 include a channel section member 36 receivable about the posts 16 and 17 and having parallel spaced side arms 38 and 40 secured near each end thereof and straddling the upright posts or members of the square A frame 12. The ends of the upper arms are spaced by handle 42 and the lower arms by spacer 44 secured therebetween. Braces 46 and 48 are secured between the upper and lower arms on respective sides of the square A frame.

The arm members 38 and 40 and braces 46 and 48 are preferably of flat strap material formed in hat-section for greater strength and rigidity without additional weight. It will be noted that the ends of the arms 38 and 40 butt the flanges of the channel member 36 and have the tab of the hat-sectioned part thereof lapped and secured to the outside of the flanges. The arm members 38 and 40 have their lower edge formed to include rack teeth 50 which are engaged by gear segment members 52 and 54 secured to the upright A frame support members 16 and 17. The arm assemblies 34 are thereby adjustable laterally in accord with the spacing of the rack teeth as will be described.

The arm assemblies 34 are supported by the upright A frame support posts 16 and 17 on the gear toothed segments 52 and 54 and are braced by their engagement with the cross brace 20 and guide rail 56 which extends between the posts as shown in Figure 5. The spacer member 44 is cut away to accommodate the guide rail as is shown.

Pendulum locks 58 are mounted on supports 16 and 17 by bracket means 60 and are disposed to engage the upper edge of the lower arm members against movement in one direction. The lock means are provided on both sides of each support post and are disposed to prevent lateral movement in opposite directions so that when both are in position they will prevent other than intentional adjustment of the arm assemblies in either direction.

In order to define the sides of the pallet type rack 10, removable side rails or bars 62 are provided between the expandable arm assemblies 34. Bracket members 64 are secured to the innermost flange of channel member 36 near the top and bottom ends thereof and include a right angle piece having an upright pin 66 secured thereto. The side bars 62 are hollow rectangular members and have aligned holes 68 through opposite sides thereof.

In the present instance the side bars 62 are shown as adapted for use in either of two positions on the guide pins 66; reference Figures 4 and 5. The holes 68 are so disposed through opposite sides of the bars 62 as to provide fractional adjustment of the extended length of the extendable arms assemblies 34 between increments of the rack teeth 50, and consequently may be used to further adjust the effective width of the rack means.

A side wall member 70, such as a sheet of plywood, may be supported on the extended flange of the lower side bar supporting brackets 64, as shown by Figure 4 and may be held in relative position by means such as the eyebolt bracket and chain 72. The wall member serves to provide a broad bearing surface engaging the outer edges of members carried on the pallet means and distributes impact forces to prevent localized damage. The wall may be swung end-for-end to extend higher if required since the bracket and chain retainer means 72 is off-centered. A further feature of the wall member is additional shoring of the materials and minor increment adjustment of the extended length of the arm assemblies according to the thickness of the wall board.

The proposed pallet means as adapted to receive a particular sized group of members for shipment will have such members stacked across the base frame 10 between the square A frame end members. The side arm assemblies will be extended to the width of the loaded members overhanging the sides of the base frame. The side bars 62 are then put in place, in whatever position closest fits the material; and, if required, the side wall members 70 are added.

If the material to be shipped extends higher than the A frame members as mounted directly on the base frame, extension members 74, as shown in Figure 1, may be added by means such as adaptors 76 received within the adjacent ends of the posts 16 and 17 and the extension members; or an additional A frame with its extendable arm assemblies may be used, if desired.

The proposed material handling means may also include a floor on the base frame by having the end angles 22 and 23 set lower than the side rails 24 and 26 and providing a shoulder 30 adapted to receive floor boards such as 32. A single board may be provided, a wire mesh screen can be used or the entire rack can be floored as required.

The claims:

1. Material handling means including a pallet base having upright end members, laterally extendable arm assemblies provided upon said end arms and extended in opposite directions therefrom, and means for controlled individual adjustment of said arm assemblies to regulate the width of said material handling means.

2. The material handling means of claim 1 which further includes having said end members removably secured to said pallet base and having removable side bars received by said arm assemblies for defining the sides of said material handling means.

3. Material handling means including a pallet base, a removable end frame member receivable upon the ends of said pallet base, means securing said end frame to said pallet base, laterally adjustable arm assemblies disposed on said end frame, said arm assemblies including parallel spaced arm members disposed on opposite sides of said end frame, and means secured to said end frame and cooperatively disposed for engagement with said arm members for supporting said arm assemblies and for providing controlled and regulated adjustment thereof.

4. Material handling means including a pallet base, removable end frame members secured to said pallet base, extendable side arm assemblies mounted upon said end frames, and adjustable side bars removably secured between said arm assemblies, said end frame members including vertical posts having cross braces connected therebetween, said arm assemblies including parallel spaced arm members secured together and disposed on opposite sides of said posts, means secured to said post and disposed for engagement with said arm members for supporting said side arm assemblies in combination with one of said cross braces, said means further providing for increment adjustment of said arm assemblies, and said side bars being adapted to provide further fractional increment adjustment of the effective width capacity of said material handling means.

5. Removable upright end frame members for attachment to opposite ends of a material handling pallet member, said end frame members including vertical posts and interconnecting cross bars, extendable arm assemblies mounted upon said end frame members and including parallel spaced arm members disposed on opposite sides of said posts, and means secured to said posts and disposed for engagement with said arm members for supporting said arm assemblies and providing for regulated lateral adjustment thereof.

6. In combination with a material handling pallet including a base member and having upright end frames mounted thereon, extendable side arm assemblies disposed on said end frames and adapted for lateral adjustment in given increments, elongated side bars extending between said arm assemblies, pin means secured to said arm assemblies, and pin receiving means formed within the ends of said side bars, said pin receiving means being formed through oppositely disposed walls of said side bars to provide fractional increment adjustment of the load carrying capacity between said side bars.

7. The combination provided for by claim 6 which further includes a side wall member retained to said arm assemblies and disposed within said side bars for providing a material edge engaging wall, said side wall member being of a thickness less than the given increment of adjustment afforded said side arm assemblies for further fractional adjustment of the load carrying capacity between said side bars.

8. The material handling pallet set forth in claim 4 wherein the lower edges of said arm members are provided with a plurality of spaced teeth, each of said posts having a tooth secured thereto and cooperating with said teeth on said arm members to provide increment adjustment of said arm assemblies with respect to said posts, and locking means secured to said posts and engaging said arm members for rigidly securing said arm assemblies in any particular position of adjustment on said posts.

References Cited in the file of this patent

UNITED STATES PATENTS

| | | |
|---|---|---|
| 303,181 | Osborn | Aug. 5, 1884 |
| 1,155,105 | Schreiner | Sept. 28, 1915 |
| 2,497,453 | Hazen | Feb. 14, 1950 |
| 2,664,258 | Lanier | Dec. 29, 1953 |
| 2,805,776 | Levitin | Sept. 10, 1957 |

FOREIGN PATENTS

| | | |
|---|---|---|
| 4,807 | Great Britain | Mar. 27, 1890 |

UNITED STATES PATENT OFFICE

CERTIFICATE OF CORRECTION

Patent No. 2,903,217 September 8, 1959

Roy T. Collins et al

It is hereby certified that error appears in the printed specification of the above numbered patent requiring correction and that the said Letters Patent should read as corrected below.

Column 3, line 35, for "arms" read -- members --.

Signed and sealed this 5th day of April 1960.

(SEAL)
Attest:

KARL H. AXLINE
Attesting Officer

ROBERT C. WATSON
Commissioner of Patents